United States Patent
Young et al.

(10) Patent No.: US 8,708,322 B2
(45) Date of Patent: Apr. 29, 2014

(54) PAYLOAD LAUNCH LOCK MECHANISM

(75) Inventors: Ken Young, Peoria, AZ (US); Timothy Hindle, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 636 days.

(21) Appl. No.: 12/940,771

(22) Filed: Nov. 5, 2010

(65) Prior Publication Data

US 2012/0112010 A1    May 10, 2012

(51) Int. Cl.
*B25B 1/00* (2006.01)

(52) U.S. Cl.
USPC ........................................................ 269/160

(58) Field of Classification Search
USPC ............. 269/24, 27, 134, 216, 224, 275, 285, 269/157, 160; 244/173.1, 173.2, 173.3
See application file for complete search history.

(56) References Cited

U.S. PATENT DOCUMENTS

| | | | |
|---|---|---|---|
| 4,753,465 A | 6/1988 | Dalby | |
| 5,060,888 A * | 10/1991 | Vezain et al. | 244/173.3 |
| 5,192,058 A * | 3/1993 | VanDalsem et al. | 269/24 |
| 5,245,738 A | 9/1993 | Johnson | |
| 5,722,709 A | 3/1998 | Lortz et al. | |
| 5,771,742 A | 6/1998 | Bokaie et al. | |
| 6,126,115 A | 10/2000 | Carrier et al. | |
| 6,175,989 B1 | 1/2001 | Carpenter et al. | |
| 6,450,725 B1 | 9/2002 | Roth et al. | |
| 6,508,437 B1 | 1/2003 | Davis et al. | |
| 6,772,479 B2 | 8/2004 | Hinkley et al. | |
| 7,422,403 B1 | 9/2008 | Johnson et al. | |
| 7,610,783 B2 | 11/2009 | Rudduck et al. | |
| 7,699,556 B2 | 4/2010 | Efremov | |
| 2003/0127784 A1 | 7/2003 | Davis | |

OTHER PUBLICATIONS

EP Communication, EP 11178893.1-2422 dated Apr. 24, 2012.
EP Search Report, EP 11178893.1-2422 dated Mar. 19, 2012.

* cited by examiner

*Primary Examiner* — Lee D Wilson
*Assistant Examiner* — Jamal Daniel
(74) *Attorney, Agent, or Firm* — Ingrassia Fisher & Lorenz, P.C.

(57) ABSTRACT

A payload launch lock mechanism includes a base, a preload clamp, a fastener, and a shape memory alloy (SMA) actuator. The preload clamp is configured to releasibly restrain a payload. The fastener extends, along an axis, through the preload clamp and into the base, and supplies a force to the preload clamp sufficient to restrain the payload. The SMA actuator is disposed between the base and the clamp. The SMA actuator is adapted to receive electrical current and is configured, upon receipt of the electrical current, to supply a force that causes the fastener to elongate without fracturing. The preload clamp, in response to the fastener elongation, either rotates or pivots to thereby release the payload.

5 Claims, 6 Drawing Sheets

PAYLOAD LAUNCH LOCK MECHANISM

STATEMENT REGARDING FEDERALLY SPONSORED RESEARCH OR DEVELOPMENT

This invention was made with Government support under NNG09HR00C awarded by NASA. The Government has certain rights in this invention.

TECHNICAL FIELD

The present invention generally relates to releasable locks for spacecraft payloads, and more particularly relates to a pivoting payload launch lock.

BACKGROUND

Many spacecraft include one or more payloads that are released after the spacecraft attains orbit. During spacecraft launch, relatively large vibration and thrust loads may be imparted on the payloads. Thus, payloads are typically mounted on the spacecraft using launch lock devices that are configured to both restrain the payloads against these vibration and thrust loads, and to subsequently release the payloads when the spacecraft attains orbit.

Commonly used launch lock devices are configured to release a payload by breaking a bolt using either pyrotechnics or a shape memory alloy (SMA). While generally safe, reliable, and robust, these launch lock devices do exhibit certain drawbacks. For example, breaking the bolt may transmit relatively high loads from high frequency acceleration (e.g., shock) to the payload. This can potentially cause damage to the payload.

Low-shock launch lock devices have been utilized using various techniques, some involving SMA materials that are used to stretch a bolt instead of breaking a bolt, thereby opening a gap and releasing the payload. This gap equates to a payload range of motion before stops are hit. Current state of the art approaches for such devices have limited dynamic ranges, and therefore result in the payload having a limited range of motion allowable, due to the specific implementation details.

Hence, there is a need for a payload launch lock device that sufficiently restrains a payload during launch, that subsequently releases the payload without transmitting relatively high loads to the payload (i.e. low shock), and increases the available range of payload motion. The present invention addresses at least this need.

BRIEF SUMMARY

In one embodiment, and by way of example only, a payload launch lock mechanism includes a base, a preload clamp, a fastener, and a shape memory alloy (SMA) actuator. The preload clamp is rotationally mounted relative to the base and is configured to releasibly restrain a payload. The fastener extends, along an axis, through the preload clamp and into the base, and supplies a force to the preload clamp sufficient to restrain the payload. The SMA actuator is disposed between, and engages, the base and the fastener. The SMA actuator is adapted to receive electrical current and is configured, upon receipt of the electrical current, to supply a force that causes the fastener to elongate without fracturing. The preload clamp, in response to the fastener elongation, rotates about the axis and releases the payload.

In another example embodiment, a payload launch lock mechanism includes a base, a preload clamp, a fastener, and a shape memory alloy (SMA) actuator. The preload clamp is pivotally mounted on the base and is configured to releasibly restrain a payload. The fastener extending, along a first axis, through the preload clamp and into the base, and supplies a force to the preload clamp sufficient to restrain the payload. The SMA actuator is disposed between, and engages, the base and the fastener. The SMA actuator is adapted to receive electrical current and is configured, upon receipt of the electrical current, to supply a force that causes the fastener to elongate without fracturing. The preload clamp, in response to the fastener elongation, pivots about a second axis that is perpendicular to the first axis and releases the payload.

In yet another exemplary embodiment, a payload launch lock mechanism includes a base, a preload clamp, a fastener, a spring, and a shape memory alloy (SMA) actuator. The preload clamp is rotationally mounted on the base and is configured to releasibly restrain a payload. The preload clamp is additionally rotatable between a locked position and an unlocked position. The fastener extends, along an axis, through the preload clamp and into the base. The fastener supplies a force to the preload clamp sufficient to restrain the payload. The spring is coupled between the base and the preload clamp, and is configured to supply a torsion force to the preload clamp that urges the preload clamp toward the unlocked position. The shape memory alloy (SMA) actuator is disposed between the base and the preload clamp. The SMA actuator is adapted to receive electrical current and configured, upon receipt of the electrical current, to supply a force that causes the fastener to elongate without fracturing. The preload clamp, in response to the fastener elongation, rotates about the axis and releases the payload.

Furthermore, other desirable features and characteristics of the pivoting payload launch lock will become apparent from the subsequent detailed description and appended claims, taken in conjunction with the accompanying drawings and preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
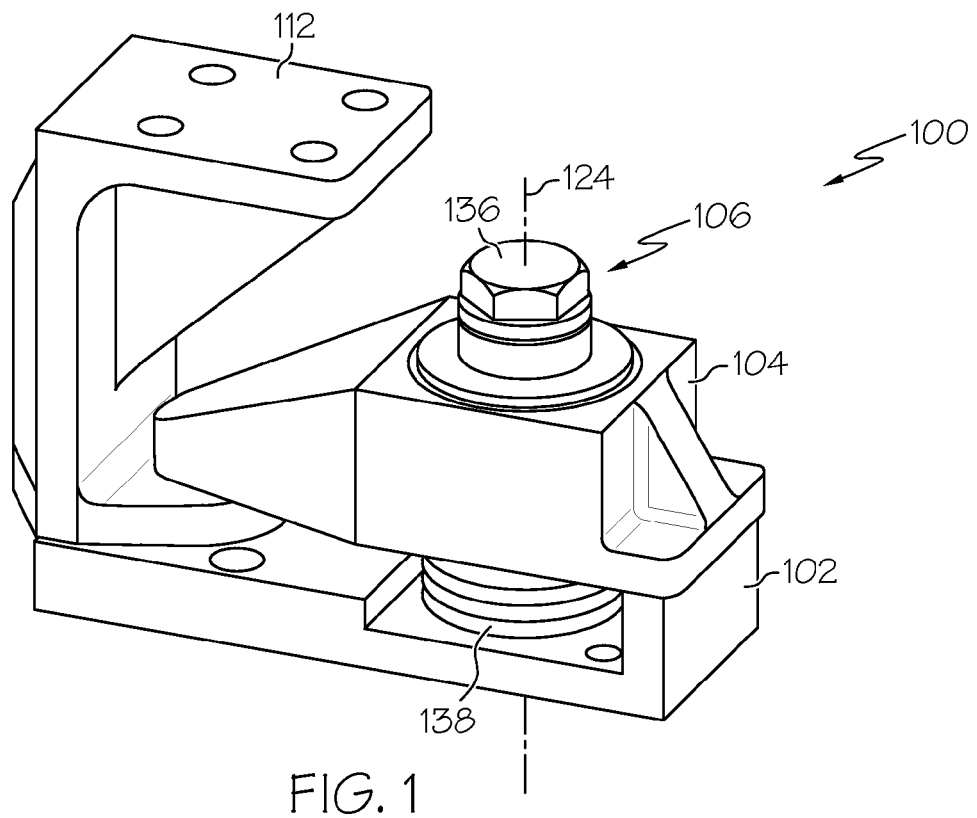
FIG. 1 depicts a perspective plan view of a first exemplary embodiment of a payload launch lock mechanism.
Figure 2:
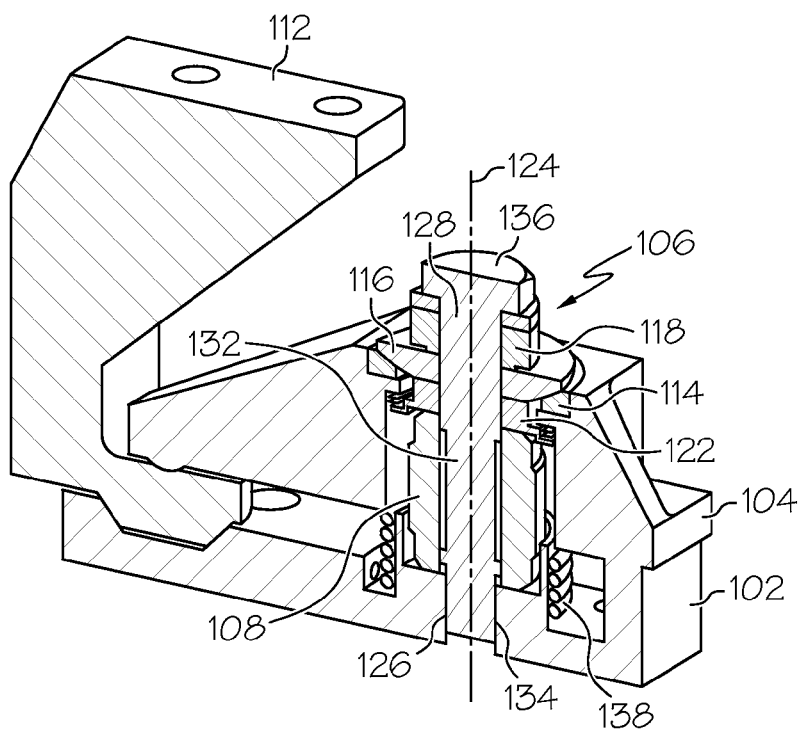
FIG. 2 depicts the cross sectional view of the exemplary payload launch lock mechanism of FIG. 1.

Referring now to FIGS. 1 and 2, one embodiment of a payload launch lock mechanism 100 is depicted and includes a base 102, a preload clamp 104, a fastener 106, and a shape memory alloy (SMA) actuator 108. The base 102 may comprise an integral portion of a vehicle, such as a spacecraft, or it may be implemented as a separate structure and coupled to the vehicle.

Figure 3:
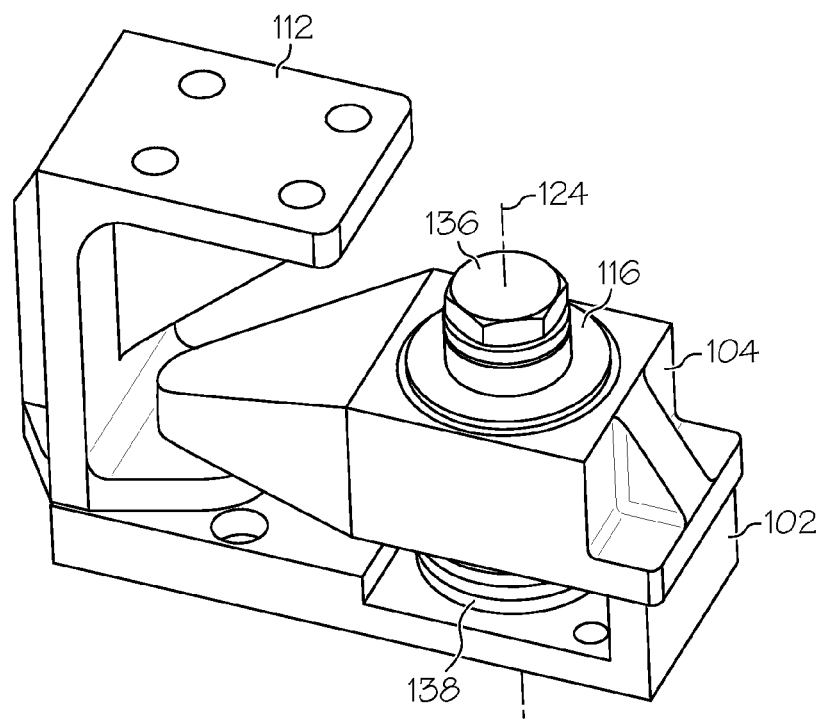
FIGS. 3 and 4 depict perspective plan views of the exemplary payload launch lock mechanism of FIG. 1 in the locked and released positions, respectively.
Figure 4:
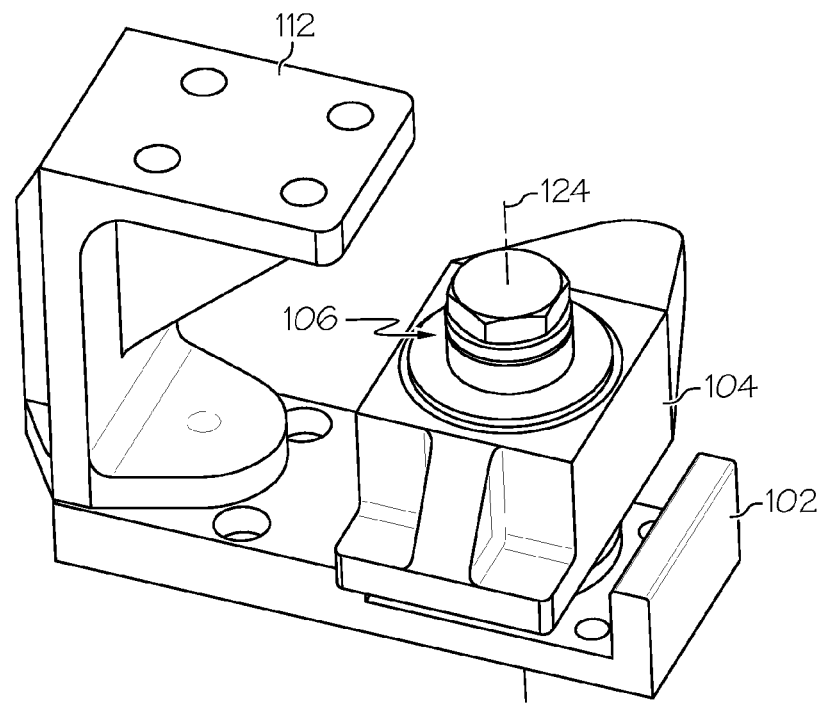
Figure 5:
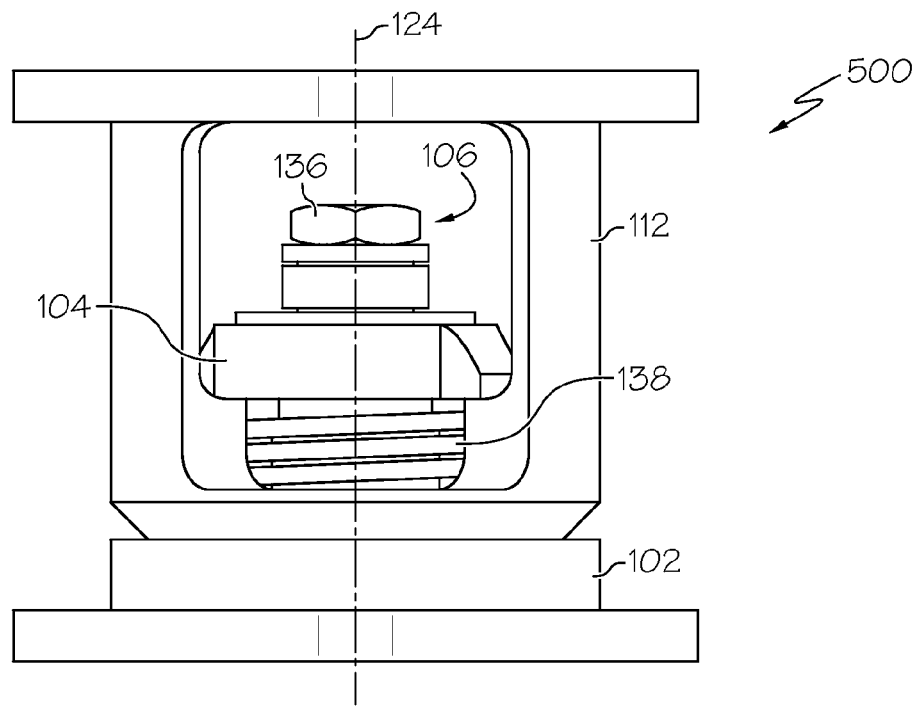
FIG. 5 depicts a perspective plan view of a second exemplary embodiment of a payload launch lock mechanism.
Figure 6:
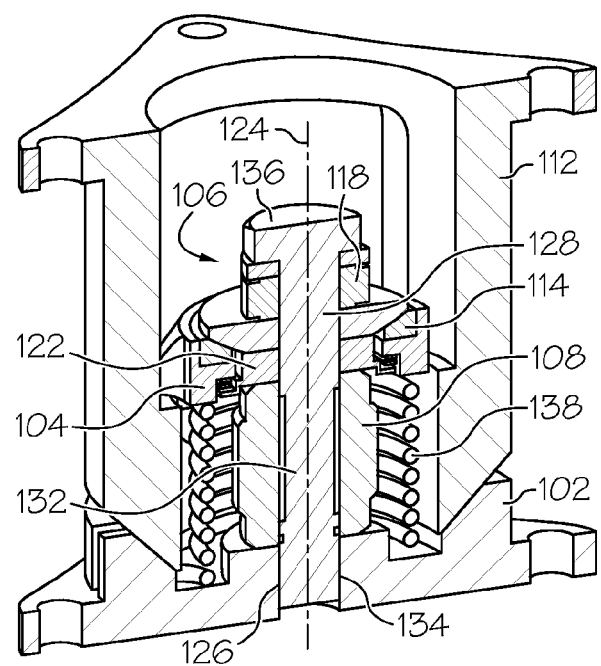
FIG. 6 depicts the cross sectional view of the exemplary payload launch lock mechanism of FIG. 5.
Figure 7:
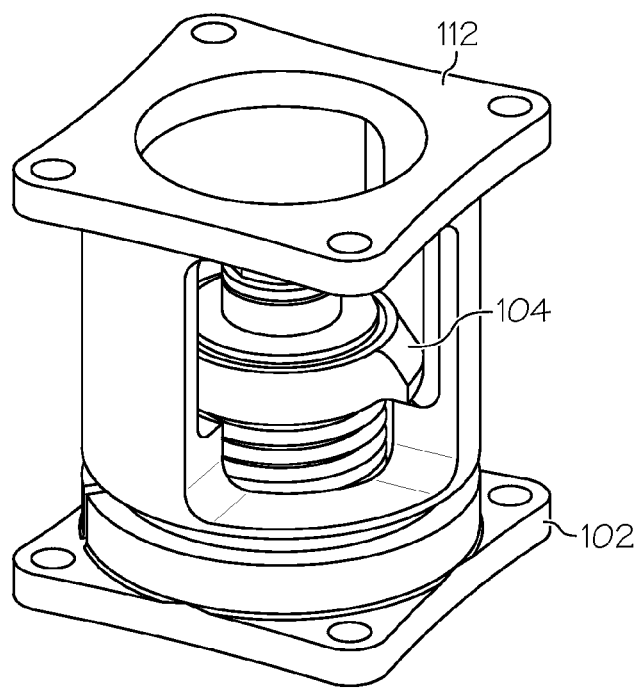
FIGS. 7 and 8 depict perspective plan views of the exemplary payload launch lock mechanism of FIG. 5 in the locked and released positions, respectively.
Figure 8:
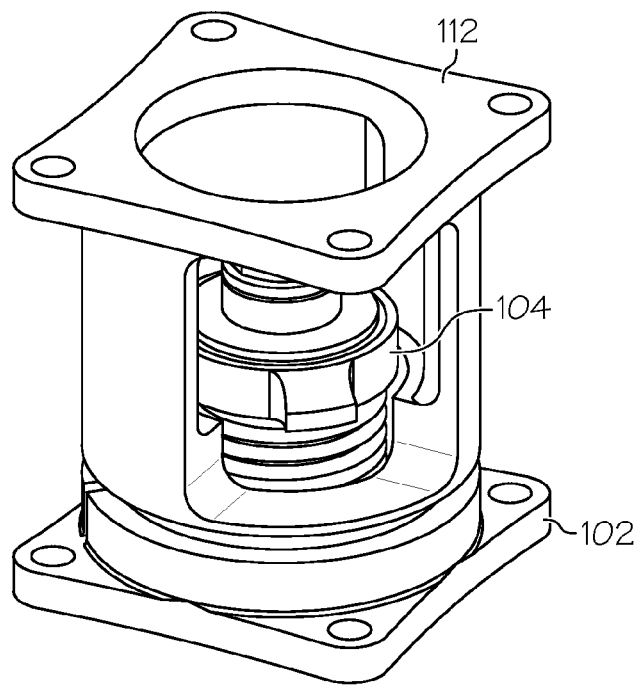
Figure 9:
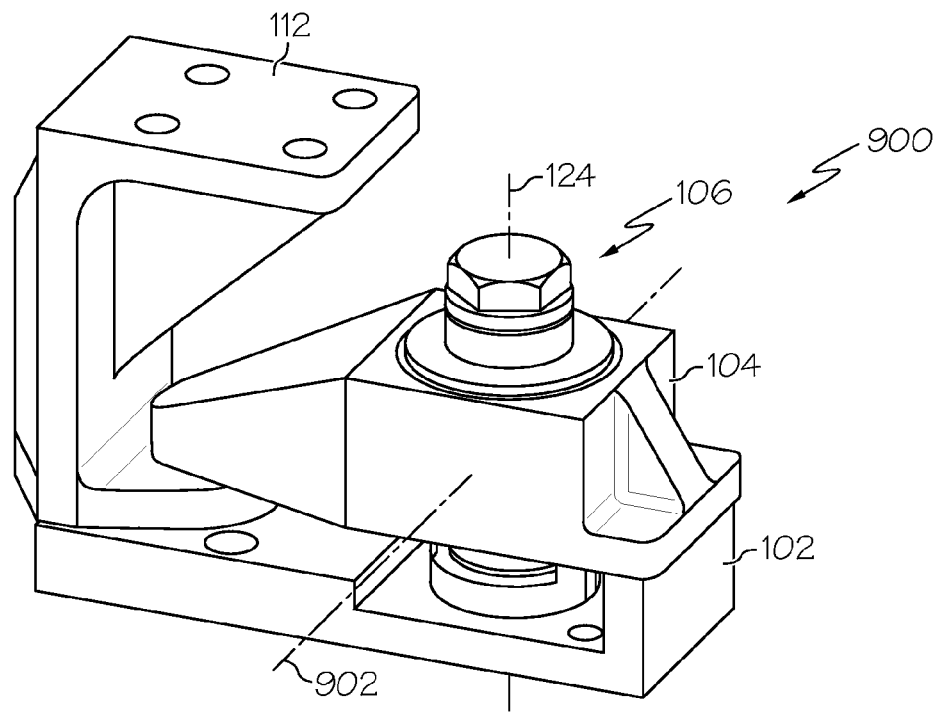
FIG. 9 depicts a perspective plan view of a third exemplary embodiment of a payload launch lock mechanism.

The preload clamp 104 is rotationally mounted relative to the base 102 and is configured to releasibly restrain a payload 112. The preload clamp 104, which in the depicted embodiment is configured as a toe clamp, is rotatable between a locked position, which is the position depicted in FIGS. 1-3, and an unlocked position, which is the position depicted in FIG. 4. The preload clamp 104 includes a hardware opening 114, and is rotationally mounted via the fastener 106 and suitable mounting hardware. Although the mounting hardware may vary, in the depicted embodiment it includes a spherical bearing 116, a first load washer 118, and a second washer 122.

The fastener 106 extends, along an axis 124, through the hardware opening 114, the spherical bearing 116, the first load washer 118, and the second washer 122, and into the base 102. The fastener 106 includes a first end section 126, a second end section 128, and a necked-down section 132. The first end section 126 has threads formed thereon that engage mating threads that are formed in a threaded opening 134 in the base 102. The necked-down section 132 is disposed intermediate the first end section 126 and the second end section 128, and has a diameter that is less than the diameters of the first and second end sections 126, 128. The fastener 106 is threaded into the threaded opening 134 and, via an adjustment head 136 formed on the second end section 128, is adjusted to supply a force to the preload clamp 104 that is sufficient to restrain the payload 112 and retain the preload clamp in the locked position.

The SMA actuator 108 is disposed between the base 102 and the preload clamp 104. The SMA actuator 108 is adapted to receive electrical current via, for example, a plurality of non-illustrated electrical leads. The SMA actuator 108 is configured, upon receipt of the electrical current, to expand and supply a force to the fastener 106. The force supplied to the fastener is sufficient to cause the fastener 106, and more specifically the necked-down section 132 of the fastener 106, to elongate without fracturing. The amount that the fastener 106 elongates may vary, and may depend, for example, upon the SMA actuator, the material composition of the fastener 106, and the dimensions of the necked-down section 132. Nonetheless, the amount of fastener elongation is sufficient to displace the preload clamp 104.

As FIGS. 1 and 2 further depict, the payload launch mechanism 100 also preferably includes a spring 138. The spring 138 is coupled between the base 102 and the preload clamp 104 and is disposed concentric with the axis 124. The spring 138 is configured, when the preload clamp 104 is rotated from the unlocked position to the locked position, to supply a torsion force to the preload clamp 104. It may thus be appreciated that when the SMA actuator 108 supplies the force that causes the fastener 106 to elongate and displace the preload clamp 104, the torsion force from the spring 138 causes the preload clamp 104 to rotate about the axis 124 and release the payload 112.

The configuration of the payload launch mechanism 100 depicted in FIGS. 1-4 and described above is merely exemplary of one particular embodiment, and could be implemented using numerous alternative configurations. One such alternative configuration is depicted in FIGS. 5-8. The alternative payload launch mechanism 500 depicted in FIGS. 5-8 is configured similar to the embodiment depicted in FIGS. 1-4. As such, like reference numerals in FIGS. 5-8 refer to like parts of the embodiment depicted in FIGS. 1-4. The main differences between these embodiments are that the preload clamp 104 in FIGS. 5-8 is not configured as toe clamp, and at least a portion of the payload 112 is concentric with the axis 124. It may thus be appreciated that the payload launch mechanism 500 depicted in FIGS. 5-8 operates substantially identical to the one depicted in FIGS. 1-4, and further description of this embodiment will not be provided.

Another alternative embodiment is depicted in FIGS. 9-12. As may be readily apparent, the payload launch mechanism 900 depicted in FIGS. 9-12 is similar to the embodiment depicted in FIGS. 1-4, in that it includes the base 102, the preload clamp 104, the fastener 106, and the SMA actuator 108. This alternative embodiment also includes the identical (or substantially identical) mounting hardware 116, 118, and 122 as the other embodiments. It is noted, however, that this embodiment does not include the same spring 138. Moreover, as will be described, the preload clamp 104 does not release the payload 112 by rotating about the axis 124.

Figure 10:
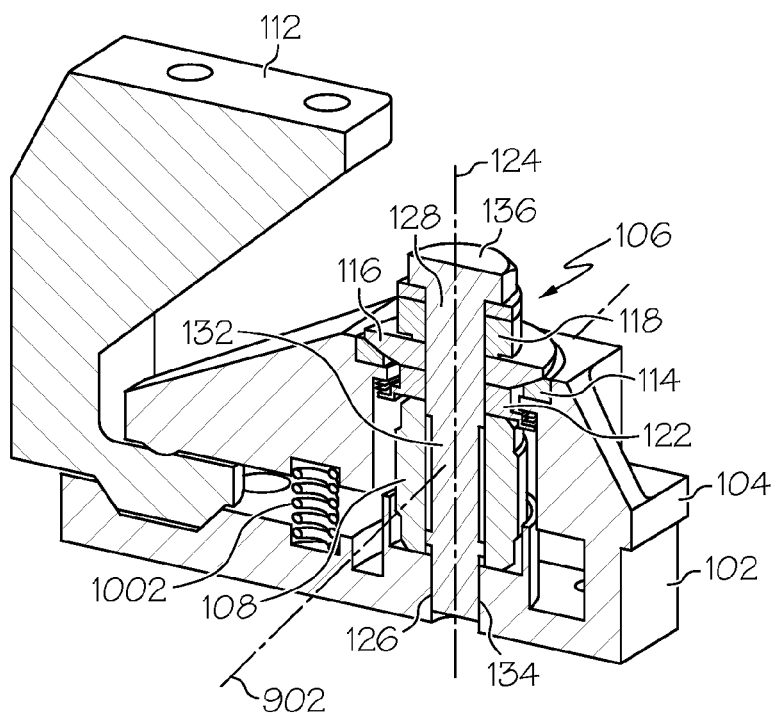
FIG. 10 depicts the cross sectional view of the exemplary payload launch lock mechanism of FIG. 9.
Figure 11:
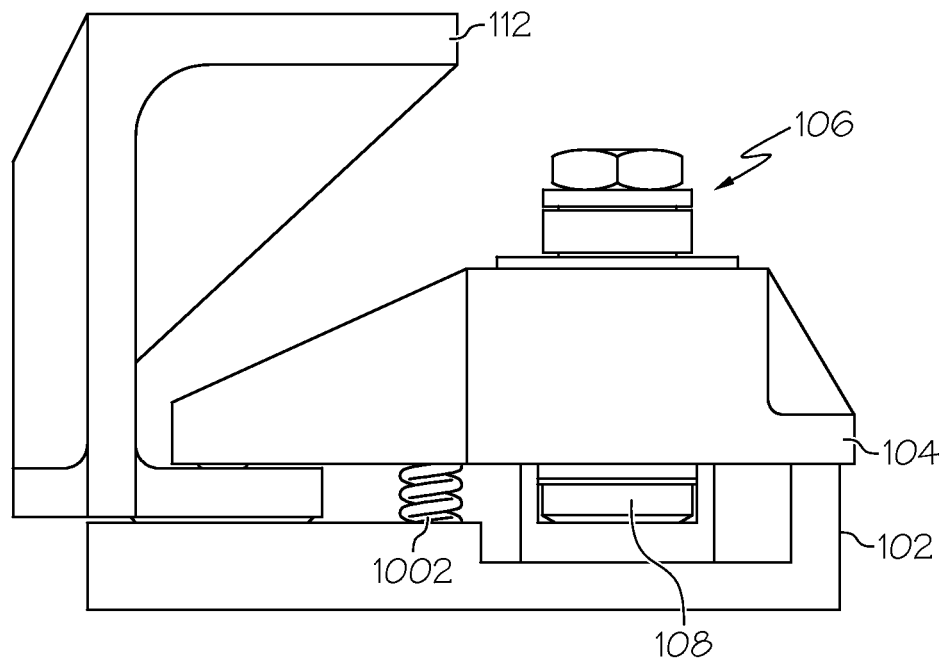
FIGS. 11 and 12 depict perspective plan views of the exemplary payload launch lock mechanism of FIG. 9 in the locked and released positions, respectively.
Figure 12:
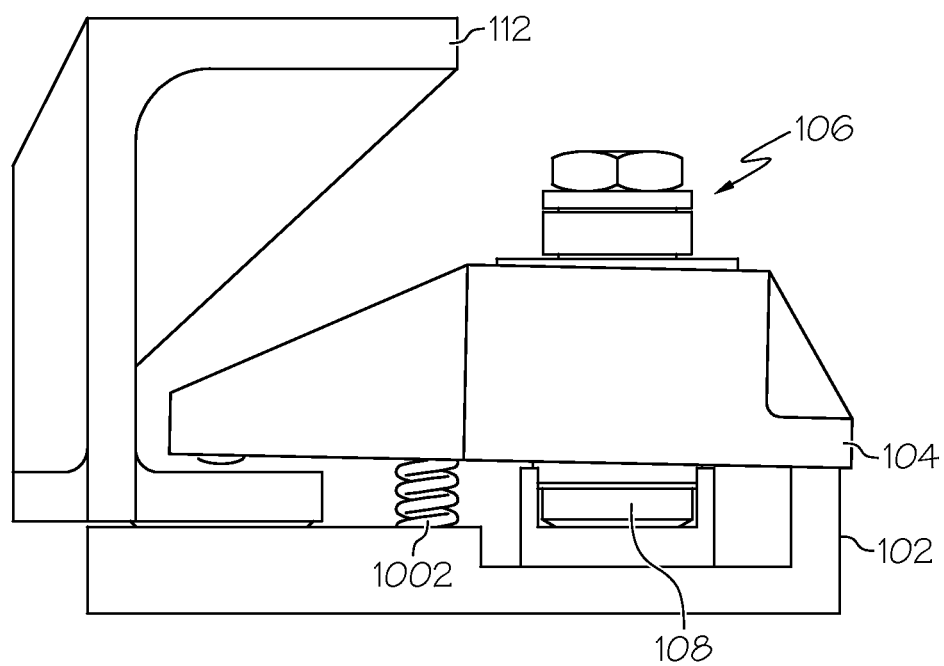

As seen most clearly in FIG. 10, the payload launch mechanism 900 of this embodiment does indeed include a spring 1002. Although the spring 1002 is coupled between the base 102 and the preload clamp 104, and supplies a force to the preload clamp 104, this force is not a torsion force about the axis 124. Rather, as depicted most clearly in FIGS. 11 and 12, the force is one that, upon elongation of the fastener 106, causes the preload clamp 104 to pivot about a second axis 902 that is perpendicular to the axis 124. Thus, rather than rotating from the locked position to the unlocked position, the preload clamp pivots from the locked position (FIGS. 9-11) to the unlocked position (FIG. 12).

The payload launch lock mechanisms 100, 500, 900 disclosed herein will sufficiently restrain a payload 112 during launch and, due to the rotating or pivoting nature of the preload clamps 104, allow subsequent release of the payload 112 without transmitting relatively high loads to the payload 112, and with larger payload ranges of motion than known mechanisms that do not have rotating or pivoting mechanisms.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A payload launch lock mechanism, comprising:
a base;
a preload clamp rotationally mounted on the base and configured to releasibly restrain a payload;
a fastener extending, along an axis, through the preload clamp and into the base, the fastener supplying a force to the preload clamp sufficient to restrain the payload and including a first end section, a second end section, and a necked-down section, the necked-down section disposed intermediate the first end section and the second end section and having a diameter less than the first end section and the second end section;
a shape memory alloy (SMA) actuator disposed between the base and the preload clamp, the SMA actuator adapted to receive electrical current and configured, upon receipt of the electrical current, to supply a force that causes the necked down section of the fastener to elongate without fracturing,
wherein the preload clamp, in response to the elongation of the necked down section, rotates about the axis and releases the payload.

2. The mechanism of claim 1, further comprising:
a spring coupled between the base and the preload clamp, and configured to supply a torsion force to the preload clamp.

3. The mechanism of claim 2, wherein:
the preload clamp is rotatable between a locked position and an unlocked position; and
the torsion force urges the preload clamp toward the unlocked position.

4. The mechanism of claim 2, wherein the spring is disposed concentric with the axis.

5. A payload launch lock mechanism, comprising:
a base;
a preload clamp rotationally mounted on the base and configured to releasibly restrain a payload, the preload clamp rotatable between a locked position and an unlocked position;
a fastener extending, along an axis, through the preload clamp and into the base, the fastener supplying a force to the preload clamp sufficient to restrain the payload and including a first end section, a second end section, and a necked-down section, the necked-down section disposed intermediate the first end section and the second end section and having a diameter less than the first end section and the second end section;
a spring coupled between the base and the preload clamp, and configured to supply a torsion force to the preload clamp that urges the preload clamp toward the unlocked position;
a shape memory alloy (SMA) actuator disposed between the base and the preload clamp, the SMA actuator adapted to receive electrical current and configured, upon receipt of the electrical current, to supply a force that causes the necked down section of the fastener to elongate without fracturing,
wherein the preload clamp, in response to the elongation of the necked down section, rotates about the axis and releases the payload.

\* \* \* \* \*